United States Patent

Okada et al.

[11] Patent Number: 5,968,498
[45] Date of Patent: Oct. 19, 1999

[54] FRESHNESS RETAINING GEL COMPOSITION

[76] Inventors: Toru Okada, 688-3, Minori, Kakogawacho, Kakogawa, Hyogo, 675; Kenji Kuranari, 6-16-25, Chayama, Jounanku, Fukuoka, Fukuoka, 814-01; Yukari Mihara, 406, 5-60, Sukuminami, Kasuga, Fukuoka, 816, all of Japan

[21] Appl. No.: 09/014,612

[22] Filed: Jan. 28, 1998

[30] Foreign Application Priority Data

Mar. 31, 1997 [JP] Japan .................................. 9-098382

[51] Int. Cl.$^6$ ............................. A61L 9/04; A01N 47/46; C09K 15/26
[52] U.S. Cl. ......................... 424/76.3; 252/402; 424/76.8; 514/514; 514/944; 514/102; 514/108; 514/109
[58] Field of Search ................................ 252/315.4, 402; 424/76.3, 76.4, 76.8; 514/514, 944, 957; 516/102, 108, 109

[56] References Cited

U.S. PATENT DOCUMENTS

| | | | |
|---|---|---|---|
| 2,955,129 | 10/1960 | Mansfield | 252/402 X |
| 3,113,908 | 12/1963 | Pieroh et al. | 514/514 |
| 3,544,608 | 12/1970 | Pande | 252/402 X |
| 4,067,824 | 1/1978 | Teng et al. | 424/76.4 X |
| 4,440,783 | 4/1984 | Downing | 514/514 |
| 4,702,916 | 10/1987 | Geria | 514/514 X |
| 4,812,309 | 3/1989 | Ong | 514/944 X |
| 5,429,816 | 7/1995 | Hofrichter et al. | 514/944 X |
| 5,703,124 | 12/1997 | Takata et al. | 514/514 |
| 5,880,150 | 3/1999 | Fujita et al. | 514/514 |

FOREIGN PATENT DOCUMENTS 1-126974   5/1989   Japan .................................. 424/76.4

*Primary Examiner*—Richard D. Lovering
*Attorney, Agent, or Firm*—Birch, Stewart, Kolasch & Birch, LLP

[57] ABSTRACT

The freshness of meat, vegetables and fruits in a refrigerator or food storage box can be retained for a long period of time by using (1) a freshness retaining gel composition which comprises a freshness retainer component comprising an isothiocyanic acid compound and an aliphatic carboxylic acid or (2) a freshness retaining gel composition which comprises a freshness retainer component comprising an isothiocyanic acid compound, a nonionic surfactant or a fatty acid ester, and a gelling agent.

11 Claims, No Drawings

FRESHNESS RETAINING GEL COMPOSITION

BACKGROUND OF THE INVENTION

The present invention relates to a freshness retaining agent to be placed in a refrigerator or a food storage cabinet for preventing decrease in the freshness of meat, fish, vegetables, etc. for a long period of time.

In this field of art, active carbon powders pretreated to absorb ethylene are known to be useful for maintaining the freshness of vegetables and fruits in the refrigerator or the like. However, decreases in the freshness of vegetables and fruits occur even in the ethylene-lean environment and, moreover, a putrefactive process is also involved. Therefore, the use of active carbon lacking in biocidal activity is not effective enough to maintain the freshness of those easily perishable foods.

On the other hand, allyl isothiocyanate ($CH_2=CHCH_2NCS$), which is contained in Japanese horseradish (wasabi) and mustard, is known to inhibit growth of pathogenic microorganisms. In particular, this substance has antibacterial activity against *Escherichia coli, Staphylococcus aureus*, Proteus species and *Vibrio parahaemolyticus*. It is, therefore, effective as a freshness retainer for fish and meat. Allyl isothiocyanate prevents emanation of ethylene, which is known to be an aging hormone for vegetables and fruits, to thereby protect vegetables and fruits from aging. Therefore, it is also useful as a freshness retainer for those foodstuffs. Japanese horseradish extracts and mustard extracts, which contain allyl isothiocyanate as a chief component, have been approved as food additives and can be safely used in the refrigerator where foodstuffs are preserved. Furthermore, allyl isothiocyanate shows its freshness retaining action in gaseous phase contact and, therefore, produces a freshness retaining effect even at a low concentration of about 0.3 ppm.

Isothiocyanic acid compounds are liquids sparingly soluble in water and having high volatility. Therefore, in the art, attempts have been made to place a paper or mineral carrier impregnated with such a compound in the refrigerator for the purpose of retaining the freshness of foodstuffs. However, the active ingredient is evaporated off rapidly from the carrier, resulting in loss of the effect in one to two days. In view of the circumstances, the present inventors made intensive investigations to find a method for retaining the freshness of foods in the refrigerator or food storage box for a very long period of time. As a result, the inventors previously proposed a gel-form freshness retaining agent comprising an isothiocyanic acid compound and a specific component such as a natural polysaccharide or an isoparaffin (Japanese Kokai Tokkyo Koho H09-51787). This freshness retaining agent emits the active ingredient over about one month. In cases where a fairly long period of time is required for transportation, for example by ship, however, the performance of this agent is not satisfactory as yet. Furthermore, when it is placed in the household refrigerator, it is necessary to check the freshness retaining agent frequently for its effectiveness; this is troublesome. Accordingly, a freshness retaining agent with which the freshness retaining effect will be maintained persistently over a still longer time is desired.

A primary object of the present invention is to provide an excellent freshness retaining agent with which the freshness of meat, vegetables and fruits in a refrigerator or a food storage box over a very long period of time. The present inventors made intensive investigations to achieve the above object. As a result, they found that the above object can be accomplished by forming a gel composition from a Japanese horseradish extract, a mustard extract or an isothiocyanic acid compound such as allyl isothiocyanate, and a specific component or components. The present invention has now been developed on the basis of such findings.

SUMMARY OF THE INVENTION

In one aspect, the present invention provides a freshness retaining gel composition which comprises an isothiocyanic acid compound and an aliphatic carboxylic acid. In another aspect, the present invention provides a freshness retaining gel composition which comprises an isothiocyanic acid compound, at least one member of the class consisting of aliphatic carboxylic acid esters and nonionic surfactants, and a gelling agent.

DETAILED DESCRIPTION OF THE INVENTION (Freshness retaining ingredient)

The isothiocyanic acid compound, which is the active ingredient in the freshness retaining gel composition of the present invention, includes allyl isothiocyanate, butyl isothiocyanate, and derivatives thereof. Among them, allyl isothiocyanate is particularly preferred. These isothiocyanic acid compounds may be either natural products or synthetic products. Japanese horseradish extracts and mustard extracts containing them as active ingredients may also be used.

The amount of the isothiocyanic acid compound in the gel composition is generally 1 to 50% by weight, preferably 10 to 40% by weight. Smaller amounts fail to produce a satisfactory freshness retaining effect, while larger amounts fail to provide good and stable gels, causing separation of water.

(Gel component(s))

(I) In accordance with the first aspect of the present invention, an aliphatic carboxylic acid is used as a component to be admixed with the above freshness retainer component for gelation and thus insuring sustained release of the freshness retainer over a long period of time. Such aliphatic carboxylic acid is preferably one containing 12 to 24 carbon atoms, such as stearic acid, oleic acid, behenic acid, lauric acid, palmitic acid, myristic acid or a coconut oil fatty acid mixture (coco-fatty acid mixture).

The proportion of the aliphatic carboxylic acid in the gel composition is 30 to 99% by weight, preferably 60 to 90% by weight.

(II) In accordance with the second aspect of the present invention, an aliphatic carboxylic acid ester or a nonionic surfactant and a gelling agent are combinedly used as components for forming the freshness retaining gel.

(i) Nonionic surfactant

As typical examples of the nonionic surfactant to be used in the practice of the present invention, there may be mentioned the following:

(1) Polyoxyethylenesorbitol tetraoleate,
(2) Polyoxyethylene fatty acid esters (polyethylene glycol fatty acid esters),
(3) Sorbitan mono-, di- or tri-fatty acid esters,
(4) Polyoxyethylene sorbitan fatty acid esters,
(5) Polyoxyethylene alkylphenyl ethers,
(6) Polyoxyethylene-polyoxypropylene glycols,
(7) Polyoxyethylene alkyl ethers,
(8) Glycerol fatty acid esters, and
(9) Ethylene glycol fatty acid esters.

As the fatty acid component of the fatty acid ester in the nonionic surfactant mentioned above, there may be mentioned saturated or unsaturated fatty acids containing 12 to 24 carbon atoms. Thus, more specifically, there may be mentioned alkyl esters of stearic acid, oleic acid, behenic acid, lauric acid, palmitic acid, myristic acid and coco-fatty acids. It is desirable that these nonionic surfactants have an HLB value of 1 to 19. These surfactants may be used either singly or as a mixture of two or more of them.

The proportion of the nonionic surfactant in the gel composition is 10 to 90% by weight, preferably 40 to 80% by weight. Lower proportions will render the gel too hard, while higher proportions will render the gel too soft.

(ii) Fatty acid ester

As the aliphatic carboxylic acid ester, there may be mentioned esters, for example alkyl esters, of the fatty acids mentioned above, namely stearic acid, oleic acid, behenic acid, lauric acid, palmitic acid, myristic acid and coco-fatty acids. Preferred species are, for example, coco-fatty acid methyl esters, methyl laurate, isopropyl myristate, methyl stearate, and natural oils such as castor oil, rapeseed oil, sesame oil and camellia oil. These fatty acid esters, when used in combination with the above-mentioned aliphatic carboxylic acids or nonionic surfactants, preferably produce a softener effect, thus softening the gel.

The proportion of the fatty acid ester in the gel composition is 2 to 40% by weight, preferably 5 to 20% by weight. Lower proportions make the gel hard, while proportions higher than the above range make the gel soft, hence fail to give good gels. These components may be added to the gel composition according to the first aspect of the present invention to produce the same effect.

(iii) Gelling agent

As the gelling agent to be used in the gel composition of the present invention, there may be mentioned hydroxystearic acid, such as 11-hydroxystearic acid or 12-hydroxystearic acid, and N-lauroyl-L-glutamic acid α, γ-di-n-butylamide, among others. In particular, hydroxystearic acid is preferred. These gelling agents are used in an amount of 1 to 40% by weight, preferably 3 to 30% by weight, based on the whole gel. When the gelling agents are used in smaller amounts, stable gels cannot be obtained. In larger amounts, the gel viscosity increases during the production process, with the result that good gels cannot be obtained.

(Production of gels)

Any of the so-far known methods of gel production may be used in producing the freshness retaining gel composition of the present invention. Thus, for example, the gel component and gelling agent are heated for melting and, after admixing the freshness retainer component therewith, the mixture is cooled to give a gel. The thus-obtained gel composition is capable of sustainedly releasing the isothiocyanic acid compound.

EXAMPLES

The following examples are further illustrative of the present invention.

Example 1

Stearic acid (70 g) was placed in a container and heated to 75° C. Then, 10 g of polyoxyethylene sorbitan monolaurate was added, and the mixture was heated with stirring until a transparent solution was obtained. Then, 20 g of allyl isothiocyanate was added, the heating was stopped, and the mixture was stirred until it became transparent. The mixture was then placed in an appropriate mold and cooled. After solidification, the solid mixture was wrapped up with a polyester-polyethylene laminate film. This samples was placed in a large-sized refrigerator (5° C., 2 m$^3$) and the isothiocyanic acid concentration in the refrigerator was monitored at timed intervals by gas chromatography over 6 months.

| Period (months) | 1 | 2 | 4 | 6 |
|---|---|---|---|---|
| Concentration in refrigerator (ppm) | 3.5 | 3.1 | 3.0 | 2.8 |

Examples 2 to 10

Using allyl isothiocyanate and other components, gel compositions were prepared according to the formulations shown in Table 1 in the same manner as the production of the gel composition of Example 1. The gel compositions obtained were each placed in a refrigerator in the same manner as mentioned above and the gas in the refrigerator was sampled at timed intervals over 6 months and analyzed by gas chromatography.

TABLE 1

| | | | Examples | | | | | | | | |
|---|---|---|---|---|---|---|---|---|---|---|---|
| | | 2 | 3 | 4 | 5 | 6 | 7 | 8 | 9 | 10 | Control |
| Allyl isothiocyanate | | 30 | 20 | 30 | 30 | 30 | 35 | 20 | 30 | 20 | |
| Palmitic acid | | 50 | — | 20 | — | — | — | 80 | — | | |
| Stearic acid | | 20 | — | — | 20 | — | — | — | — | | |
| Sorbitan monostearate | | — | 10 | — | — | — | — | — | — | | |
| Polyoxyethylenesorbitan monolaurate (HLB 16.7) | | — | — | 50 | — | — | — | — | 50 | | |
| Polyoxyethylene nonylphenyl ether | | — | 50 | — | — | — | — | — | — | | |
| Glycerol monostearate | | — | — | — | 50 | — | — | — | — | | |
| Polyethylene glycol dioleate | | — | — | — | — | 60 | — | — | — | 75 | |
| Polyoxyethylenesorbitol tetraoleate | | — | — | — | — | — | 50 | — | — | | |
| 11-Hydroxystearic acid | | — | 20 | — | — | 5 | 15 | — | 20 | | |
| Lauroyl-L-glutamic acid butylamide | | — | — | — | — | 5 | — | — | — | 5 | |
| AIT concentration | After 3 months | 2.9 | 3.1 | 3.2 | 3.3 | 3.5 | 3.0 | 3.3 | 3.1 | 3.5 | 0.1 |

TABLE 1-continued

|  |  | Examples | | | | | | | | | |
| --- | --- | --- | --- | --- | --- | --- | --- | --- | --- | --- | --- |
|  |  | 2 | 3 | 4 | 5 | 6 | 7 | 8 | 9 | 10 | Control |
| in refrigerator | After 5 months | 2.9 | 3.0 | 2.9 | 2.9 | 3.0 | 3.0 | 3.1 | 3.1 | 3.5 | 0 |
| 5° C. (capacity 2 m$^3$) (ppm) | After 6 months | 2.6 | 3.0 | 2.6 | 2.9 | 3.0 | 2.8 | 3.0 | 2.9 | 2.2 | 0 |

AIT: Allyl isothiocyanate;
Control: Isothiocyanic acid-based freshness retainer, trademark "Wasaguard", product of Kabushiki Kaisha Seitsu.

As is evident from Table 1, the concentration (1 ppm) at which the freshness of fruits and so forth can be retained to a satisfactory extent could be maintained even after the lapse of 6 months. When apples were stored in a refrigerator not containing a gel composition, browning was observed on day 4 and remarkable browning on day 10. When stored in the refrigerator containing the gel composition of Example 1, apples showed no particular change in appearance until day 10.

EFFECTS OF THE INVENTION

The gel composition of the present invention maintains the freshness of meat, vegetables and fruits in a refrigerator or food storage container for a long period of time. Therefore, even when a prolonged transportation by ship is involved, no exchange of the freshness retaining agent is required. The composition is solid, hence easy to handle. It requires only a small space for placing.

What is claimed is:

1. A freshness retaining gel composition which comprises:
   (i) a freshness retainer component comprising 1 to 50% by weight of an isothiocyanic acid compound; and
   (ii) 30 to 99% by weight of an aliphatic carboxylic acid comprising from 12 to 24 carbon atoms.

2. A freshness retaining gel composition as claimed in claim 1, wherein the aliphatic carboxylic acid comprises at least one member of the class consisting of stearic acid, oleic acid, behenic acid, lauric acid, palmitic acid, myristic acid and coconut oil fatty acids.

3. A freshness retaining gel composition according to claim 1, wherein said isothiocyanic acid compound in said gel composition is present in an amount of 10 to 40% by weight, and said aliphatic carboxylic acid is present in an amount of 60 to 90% by weight.

4. A freshness retaining gel composition according to claim 1, wherein said isothiocyanic acid compound is allyl isothiocyanate or butyl isothiocyanate.

5. A freshness retaining gel composition as claimed in claim 1 which further comprises 2 to 40% by weight of a fatty acid ester and/or 10 to 90% by weight of a nonionic surfactant.

6. A freshness retaining gel composition according to claim 5, wherein said fatty acid ester in said gel composition is present in an amount of 5 to 20% by weight, and said nonionic surfactant is present in an amount of 40 to 80% by weight.

7. A freshness retaining gel composition which comprises:
   (i) a freshness retainer component comprising 1 to 50% by weight of an isothiocyanic acid compound,
   (ii) 10 to 90% by weight of a nonionic surfactant; and
   (iii) 1 to 40% by weight of at least one gelling agent selected from the group consisting of 11-hydroxystearic acid, 12-hydroxystearic acid and N-lauroyl-L-glutamic acid α, γ-di-n-butylamide.

8. A freshness retaining gel composition as claimed in claim 1 or 7, wherein the freshness retainer component is allyl isothiocyanate, butyl isothiocyanate, a Japanese horseradish extract or a mustard extract.

9. A freshness retaining gel composition as claimed in claim 5 or 7, wherein the nonionic surfactant comprises at least one surfactant selected from the group consisting of polyoxyethylenesorbitol tetraoleate, polyoxyethylene fatty acid esters, sorbitan mono-, di- or trifatty acid esters, polyoxyethylene sorbitan fatty acid esters, polyoxyethylene alkylphenyl ethers, polyoxyethylene-polyoxypropylene glycol, polyoxyethylene alkyl ethers, glycerol fatty acid esters, and ethylene glycol fatty acid esters.

10. A freshness retaining gel composition as claimed in claim 5 or 7, wherein the fatty acid ester comprises at least one member of the class consisting of coconut oil fatty acid methyl esters, methyl laurate, isopropyl myristate, methyl stearate, camellia oil, castor oil, rapeseed oil, and sesame oil.

11. A freshness retaining gel composition according to claim 7, wherein said isothiocyanic acid compound in said gel composition is present in an amount of 10 to 40% by weight, said nonionic surfactant is present in an amount of 40 to 80% by weight, and said gelling agent is present in an amount of 3 to 30% by weight.

* * * * *